United States Patent
Nakamura

(10) Patent No.: US 7,942,177 B2
(45) Date of Patent: May 17, 2011

(54) PNEUMATIC TIRE WITH TREAD HAVING LUG GROOVES, SIPES, AND FINE GROOVE

(75) Inventor: Daichi Nakamura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 232 days.

(21) Appl. No.: 12/466,050

(22) Filed: May 14, 2009

(65) Prior Publication Data

US 2009/0301623 A1  Dec. 10, 2009

(30) Foreign Application Priority Data

Jun. 4, 2008  (JP) ................... 2008-146801

(51) Int. Cl.
*B60C 11/12* (2006.01)
(52) U.S. Cl. ......... 152/209.22; 152/209.27; 152/209.28; 152/DIG. 3
(58) Field of Classification Search ............. 152/209.18, 152/209.22, 209.27, 209.28, DIG. 3
See application file for complete search history.

(56) References Cited

U.S. PATENT DOCUMENTS

| 5,240,053 A | * | 8/1993 | Baumhofer et al. | ..... 152/209.22 |
| D417,174 S | * | 11/1999 | Lee | ............... D12/546 |
| 2002/0139460 A1 | * | 10/2002 | Boiocchi et al. | ........... 152/209.2 |

FOREIGN PATENT DOCUMENTS

| JP | A 5-286312 | | 11/1993 |
| JP | 2002-067623 | * | 3/2002 |
| JP | A 2002-67623 | | 3/2002 |
| JP | 2003-146020 A | | 5/2003 |
| JP | 2004-168189 A | | 6/2004 |
| JP | 2005-047397 A | | 2/2005 |
| JP | 2005-186850 A | | 7/2005 |
| JP | A 2005-231430 | | 9/2005 |
| JP | 2007-331411 A | | 12/2007 |

OTHER PUBLICATIONS

Machine translation for Japan 2002-067623 (no date).*

* cited by examiner

*Primary Examiner* — Steven D Maki
(74) *Attorney, Agent, or Firm* — Greer, Burns & Crain, Ltd.

(57) ABSTRACT

Provided is a pneumatic tire that has a directional tread pattern and includes: a rib-shaped first land area extending in the tire-circumferential direction in a center section of a tread portion; paired first main grooves being adjacent respectively to the two sides of the first land area; paired second land areas being adjacent respectively to the outer sides of the first main grooves; paired second main grooves being adjacent respectively to the outer sides of the second land areas; paired third land areas being adjacent respectively to the outer sides of the second main grooves; a fine groove extending at the center of the first land area; plural lug grooves formed in the first land area; and plural sipes formed in the first land area. Each lug groove intersects with a corresponding sipe. An end of the lug groove formed in the first land area is formed as a dead end between the fine groove and a corresponding first main groove. The width and depth of each lug groove formed in the first land area are gradually reduced from its open-end side to its closed-end side. Each sipe formed in the first land area communicates with the fine groove, and includes: a deeper section between a corresponding first main groove and the intersection with a corresponding lug groove; and a shallower section between the fine groove and the intersection with the corresponding lug groove.

6 Claims, 2 Drawing Sheets

PNEUMATIC TIRE WITH TREAD HAVING LUG GROOVES, SIPES, AND FINE GROOVE

BACKGROUND OF THE INVENTION

1. Field of the Invention

The present invention relates to a pneumatic tire that has a directional tread pattern. To be more specific, the invention relates to a pneumatic tire capable of balancing the driving stability on a dry road surface with the performance on snow.

2. Description of the Related Art

Various proposals have been made for a pneumatic tire having a directional tread pattern that corresponds to a designated rotational direction of the tire (see, for example, Japanese patent application Kokai publication Nos. Hei 5-286312, 2002-67623, and 2005-231430). A pneumatic tire with a directional tread pattern includes plural main grooves and plural lug grooves in the tread portion. Each plural main groove extends in the tire-circumferential direction, and each plural lug groove extends in the tire-width direction. In addition, each lug groove is inclined in a direction opposite to the rotational direction of the tire while extending from the tread-center side to either one of the shoulder sides. The pneumatic tire with such a construction can exhibit favorable water drainage and excellent driving stability on a dry road surface.

An attempt to improve the performance on snow makes a pneumatic tire with a directional tread pattern have a difficulty in balancing the performance on snow with the driving stability on a dry road surface. For example, although enhancing the performance on snow, an increase in the number of lug-groove elements in the tread portion has a harmful effect on the tread stiffness. Such low tread stiffness results in a low driving stability on a dry road surface. In addition, forming many narrow lug grooves, which are more likely to be stuffed with snow, cannot always lead to a sufficient effect of improving the performance on snow.

SUMMARY OF THE INVENTION

An object of the present invention is providing a pneumatic tire having a directional tread pattern and being capable of balancing the driving stability on a dry road surface and the performance on snow.

To achieve the above-mentioned object, an aspect of the present invention provides a pneumatic tire having a directional tread pattern with the following characteristic features. The provided pneumatic tire includes: a first land area being rib-shaped and extending in the tire-circumferential direction and located in a center section of a tread portion; a pair of first main grooves extending in the tire-circumferential direction and being adjacent respectively to the two sides of the first land area; a pair of second land areas extending in the tire-circumferential direction and being adjacent respectively to the outer sides of the first main grooves; a pair of second main grooves extending in the tire-circumferential direction and being adjacent respectively to the outer sides of the second land areas; a pair of third land areas extending in the tire-circumferential direction and being adjacent respectively to the outer sides of the second main grooves; a fine groove extending in the tire-circumferential direction and being formed at the center of the first land area; a plurality of lug grooves being formed in the first land area and each extending from a corresponding one of the first main grooves towards the fine groove; and a plurality of sipes which are formed in the first land area and each of which extends from a corresponding one of the first main grooves towards the fine groove. The plurality of lug grooves alternate with the plurality of sipes along the tire-circumferential direction. Each of the lug grooves intersects with a corresponding one of the sipes. An end of each of the lug grooves formed in the first land area is formed as a dead end located between the fine groove and a corresponding one of the first main grooves. The width and the depth of each of the lug grooves formed in the first land area are gradually reduced from the open-end side of the lug groove to the closed-end side thereof. Each of the sipes formed in the first land area communicates with a corresponding one of the fine grooves. Each of the sipes formed in the first land area includes: a deeper section which lies between a corresponding one of the first main grooves and an intersection with a corresponding one of the lug grooves; and a shallower section which lies between the fine groove and the intersection with the corresponding lug groove and which is shallower than the deeper section.

In the pneumatic tire having a directional tread pattern according to the aspect of the present invention, the fine groove extending in the tire-circumferential direction is formed at the center of the first land area. In the first land area, the lug grooves alternate with the sipes along the tire-circumferential direction. Each of the lug grooves intersects with a corresponding one of the sipes. The above-mentioned end of each of the lug grooves formed in the first land area is formed as a dead end located between the fine groove and a corresponding one of the first main grooves. The width and the depth of each of the lug grooves formed in the first land area are gradually reduced from the open-end side of the lug groove to the closed-end side thereof. Each of the sipes formed in the first land area communicates with the corresponding fine groove, and includes: a deeper section which lies between a corresponding one of the first main grooves and an intersection with a corresponding one of the lug grooves; and a shallower section which lies between the fine groove and the intersection with the corresponding lug groove and which is shallower than the deep section. Accordingly, the first land area located in the center section of the tread portion can have enough stiffness to improve the driving stability and the braking performance on a dry road surface. On the other hand, the intersecting of each lug groove and a corresponding sipe in the first land area encourages the rolling of the tire to cause deformation of the lug grooves formed in the first land area. Such deformation makes it easier to clear the lug grooves of the snow that the lug grooves have been stuffed with. What is obtainable accordingly is an improvement in the performance on snow.

In the pneumatic tire of the aspect of the present invention, it is preferable that each of the lug grooves and of the sipes formed in the first land area should have an inclination angle with respect to the tire-circumferential direction, and that at least either one of the lug groove and the sipe should be curved. It is more preferable that each lug groove in the first land area should have an inclination angle of 10° to 40° with respect to the tire-circumferential direction, and that each sipe in the first land area should have an inclination angle of 30° to 60° with respect to the tire-circumferential direction. What is obtainable accordingly is a balance between high driving stability on a dry road surface and high performance on snow.

In addition, it is preferable that the pneumatic tire should further include a plurality of lug grooves formed in each of the second land areas. Each second land area is formed in a block column including a plurality of blocks defined by the plurality of lug grooves. It is more preferable that each of the lug grooves in the second land areas should be formed on an extended line of a corresponding one of the lug grooves in the first land area. What is obtainable accordingly is an improvement in the water drainage.

Moreover, it is preferable that the pneumatic tire should further include a plurality of lug grooves and a plurality of sipes formed in each of the third land areas. Each of the lug grooves formed in the third land areas has a larger inclination angle with respect to the tire-circumferential direction than that of each of the lug grooves formed in the second land areas. Each of the lug grooves formed in the third land areas has an opening to its corresponding contact edge and does not communicate with its corresponding second main groove. Each of the sipes formed in the third land areas is curved and bow-shaped. Each of the sipes formed in the third land areas has openings both to a corresponding one of the second main grooves and to a corresponding one of the contact edges. In each of the third land areas, the lug grooves should alternate with the sipes along the tire-circumferential direction, and each of the lug grooves should intersect with a corresponding one of the sipes. Since the lug grooves formed in the third land areas do not communicate with the second main grooves, the third land areas can have enough stiffness to make the cornering performance satisfactory, and, at the same time, the traction on snow can be increased. In addition, the intersecting of each lug groove formed in the third land areas with a corresponding sipe encourages the rolling of the tire to cause deformation of the lug grooves formed in the third land areas. Such deformation makes it easier to clear the lug grooves of the snow that the lug grooves have been stuffed with. What is obtainable accordingly is an improvement in the performance on snow.

In the descriptions of the present invention, the main groove refers to a groove with a groove width of 6.0 mm to 18.0 mm and a groove depth of 6.0 mm to 16.0 mm. The fine groove refers to a groove with a groove width of 1.0 mm to 3.0 mm and a groove depth of 2.0 mm to 5.0 mm. Each of the lug grooves has neither groove width nor groove depth specifically defined, but is preferably narrower and shallower than the main groove. The sipe refers to a groove with a groove width of 0.5 mm to 2.0 mm and a groove depth of 2.0 mm to 10.0 mm.

In the descriptions of the present invention, the contact edge refers to an outermost end, in the tire-axial direction, of the contact area formed between the tire and the road surface under the following conditions. The inflation pressure is 200 kPa. The tire is placed on a flat surface so that the tread portion can be in contact with the flat surface. The tire carries an 85% load of the load capacity at 200 kPa specified for each tire by the standard that the tire complies with (i.e., JATMA, TRA, or ETRTO)

DETAILED DESCRIPTION OF THE PREFERRED EMBODIMENTS

Figure 1:
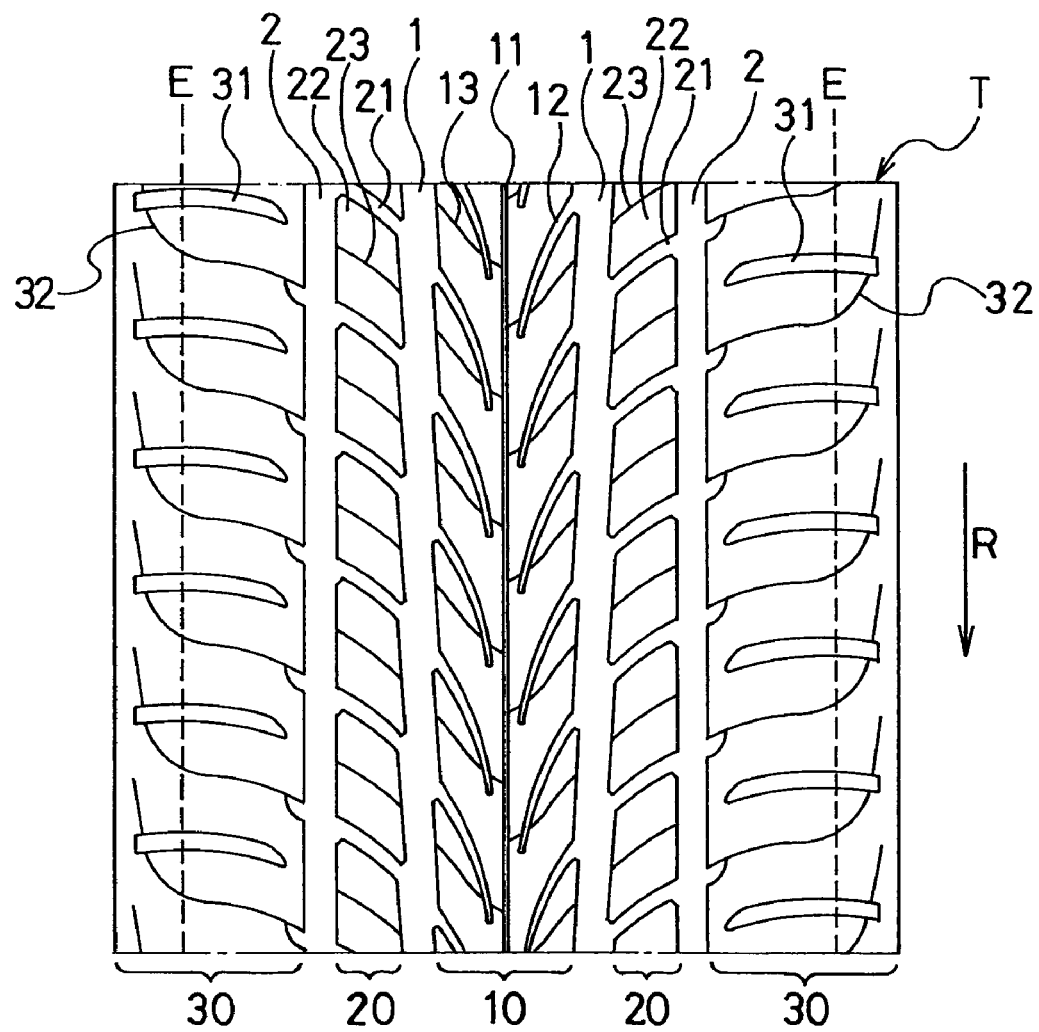
FIG. 1 is a development view illustrating a tread pattern of a pneumatic tire according to an embodiment of the present invention.
Figure 2:
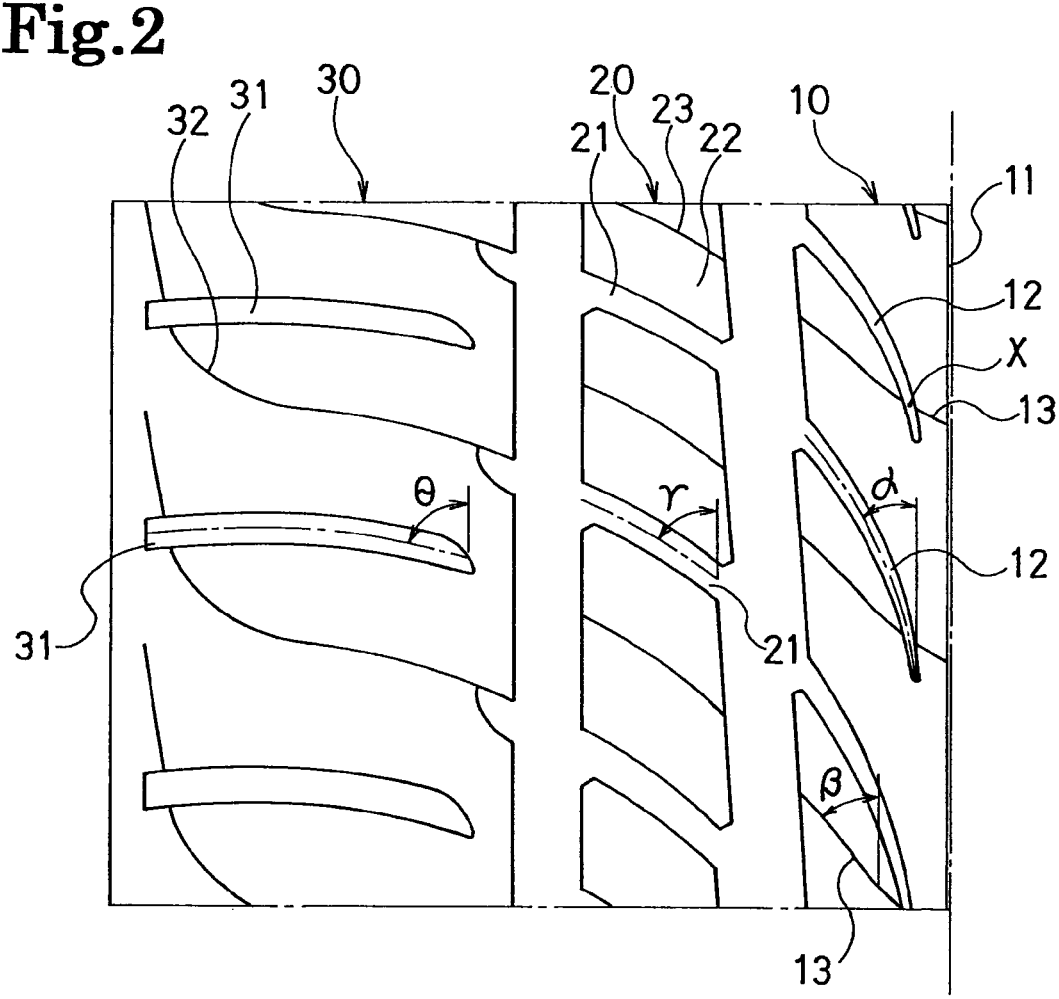
FIG. 2 is an enlarged view illustrating a principal portion of the tread pattern shown in FIG. 1.

A configuration of the present invention will be described below in detail by referring to the accompanying drawings. FIG. 1 is a development view illustrating a tread pattern of a pneumatic tire according to an embodiment of the present invention. FIG. 2 is an enlarged view illustrating a principal portion of the tread pattern shown in FIG. 1.

FIG. 1 shows that a pair of main grooves 1 and 1 (first main grooves) and a pair of main grooves 2 and 2 (second main grooves) are formed in a tread portion T. All of these grooves 1 and 2 extend in the tire-circumferential direction. The pair of main grooves 1 and 1 are formed respectively at the two sides of the tire equator, and the pair of main groove 2 and 2 are formed at the outer sides of the main grooves 1 and 1, respectively. These main grooves 1 and 2 defines five columns of land areas in the tread portion. Specifically, the tread portion T includes: a rib-shaped land area 10 (a first land area) which extend in the tire-circumferential direction in the center section of the tread portion T; the pair of main grooves 1 and 1 which extend in the tire-circumferential direction and which are adjacent respectively to the two sides of the land portion 10; a pair of land areas 20 and 20 (second land areas) which extend in the tire-circumferential direction and which are adjacent to the respective outer sides of the main grooves 1 and 1; the pair of main grooves 2 and 2 which extend in the tire-circumferential direction and which are adjacent to the respective outer sides of the land areas 20 and 20; a pair of land areas 30 and 30 (third land areas) which extend in the tire-circumferential direction and which are adjacent to the respective outer sides of the main grooves 2 and 2. In addition, the tread portion T includes plural lug grooves and plural sipes which are formed extending in the tire-width direction. A directional tread pattern is formed by inclining each of these lug grooves and sipes in the opposite direction to the rotational direction of the tire (denoted by R in FIG. 1) from the tread-center side towards a corresponding one of the shoulder sides. Further details of these lug grooves and sipes will be given later.

A straight fine groove 11 extending in the tire-circumferential direction is formed at the center, in the width direction, of the land area 10. The fine groove 11 is narrower and shallower than each of the main grooves 1 and 2, so that the fine groove 11 does not cause substantially any loss of the stiffness of the land portion 10. In addition, plural lug grooves 12 and plural sipes 13 are also formed in the land area 10. The lug grooves 12 and the sipes 13 extend from a corresponding one of the main grooves 1 towards the fine groove 11. The lug grooves 12 alternate with the sipes 13 along the tire-circumferential direction. Each lug groove 12 and each sipe 13 are inclined with respect to the tire-circumferential direction, and at least either the lug grooves 12 or the sipes 13 are curved. Accordingly, every one of the lug grooves 12 intersects with a corresponding one of the sipes 13.

Figure 3:
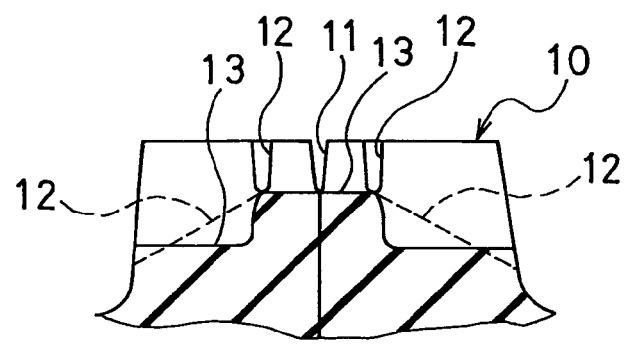
FIG. 3 is a sectional view, taken along a sipe, of a land area located in the center section of the tread portion in the tread pattern shown in FIG. 1.

Each lug groove 12 formed in the land area 10 is discontinued at a position located between the corresponding main groove 1 and the fine groove 11 (i.e., each lug groove 12 has a dead end). Both the width and the depth of the lug groove 12 are gradually reduced from its widest and deepest open end towards its narrowest and shallowest closed end. The sipes 13 of the land area 10, on the other hand, communicate with the fine groove 11. Each sipe 13 has a deeper section which lies between the main groove 1 and an intersection X with a corresponding one of the lug grooves 12 and a shallower section which lies between the fine groove 11 and the intersection X with the corresponding lug groove 12 and which is shallower than the deeper section. FIG. 3 illustrates a section of the land area 10 taken along the sipes 13. FIG. 3 shows that each of the lug grooves 12 and the sipes 13 has a shallower part located near the center of the land area 10.

In the pneumatic tire with the above-described directional tread pattern, the land area 10 has the following construction. The fine groove 11 extending in the tire-circumferential direction is formed at the center of the land area 10. In the land area 10, the lug grooves 12 and the sipes 13 are formed alternately along the tire-circumferential direction. Each lug groove 12 intersects with the corresponding sipe 13. One of the two ends of the lug groove 12 is formed as a dead end located between the corresponding main groove 1 and the fine groove 11. Both the width and the depth of each lug groove 12 are gradually reduced from its widest and deepest open end towards its narrowest and shallowest closed end. The sipes 13, on the other hand, communicate with the fine groove 11. Each sipe 13 has a deeper section which lies between the main groove 1 and the intersection X with a corresponding one of the lug grooves 12 and a shallower section which lies between the fine groove 11 and the intersection X with the corresponding lug groove 12 and which is shallower than the deeper section. Accordingly, the land area 10 in the center section of the tread portion T can have sufficient stiffness, and such construction of the pneumatic tire can improve both the driving stability and the braking performance of the vehicle running on a dry road surface. In addition, the intersecting of the lug grooves 12 with their respective sipes 13 in the land area 10 encourages the lug grooves 12 of the land area 10 to deform while the tire is rolling. Such deformation of the lug grooves 12 makes it easier to clear the lug grooves 12 of the snow that the lug grooves 12 have been stuffed with. Such a construction of the tire can improve the performance on snow.

FIG. 2 shows how each lug groove 12 and each sipe 13 are formed in the land area 10. The inclination angle (average inclination angle), denoted by α, of each lug groove 12 of the land area 10 with respect to the tire-circumferential direction is in a range from 10° to 40°. The inclination angle (average inclination angle), denoted by β, of each sipe 13 of the land area 10 with respect to the tire-circumferential direction is in a range from 30° to 60°. The inclination angles α and β set as above help to balance higher driving stability of the vehicle running on a dry road surface and higher performance of the vehicle running on a show-covered road surface. If the inclination angles α and β are too small, the land area 10 has a lower stiffness, which in turn impairs the driving stability on a dry road surface. In contrast, if the inclination angles α and β are too large, each of the lug grooves 12 and of the sipes 13 becomes shorter. Such short lug grooves 12 and such short sipes 13 result in low performance on snow.

In the above-described pneumatic tire, plural lug grooves 21 that extend in the tire-width direction are formed in the land areas 20 and 20. Accordingly, each land area 20 is formed as a block column including plural blocks 22 that are formed by dividing the land area 20 with the plural lug grooves 21. A sipe 23 that extends in the tire-width direction is formed between every two adjacent lug grooves 21. Forming each land area 20 as a block column improves the performance on snow. Note that, since the land area 10 located in the center section of the tread portion T has enough stiffness, a satisfactory driving stability can be obtained even when each land area 20 is formed as a block column. In addition, each of the lug grooves 21 in the land areas 20 is formed on the extended line of a corresponding one of the lug grooves 12 in the land area 10. Such lug-groove formation allows improved water drainage.

Plural lug grooves 31 and plural sipes 32 are formed in each land area 30. The lug grooves 31 alternate with the sipes 32 along the tire-circumferential direction. Each lug groove 31 has an open end to a corresponding one of contact edges E, but do not communicate with the corresponding main groove 2. Each sipe 32 is curved and formed into a bow shape. An end of each sipe 32 is open to the corresponding main groove 2 while the other end thereof is open to the corresponding contact edge E. The inclination angle (average inclination angle), denoted by θ, of each lug groove 31 of the land areas 30 with respect to the tire-circumferential direction is larger than the inclination angle (average inclination angle), denoted by γ, of each lug groove 21 of the land areas 20 with respect to the tire-circumferential direction. In addition, each lug groove 31 intersects with the corresponding sipe 32.

Since the lug grooves 31 formed in the land areas 30 do not communicate with their corresponding main grooves 2, the land areas 30 can have enough stiffness to make the cornering performance satisfactory. At the same time, the traction on show can be increased. In addition, the intersecting of the lug grooves 31 with their respective sipes 32 in the land areas 30 encourages the lug grooves 31 of the land areas 30 to deform while the tire is rolling. Such deformation of the lug grooves 31 makes it easier to clear the lug grooves 31 of the snow that the lug grooves 31 have been stuffed with. Such a construction of the tire can improve the performance on snow.

A preferred embodiment of the present invention has been described thus far in detail. Various modifications, substitutions, and replacements can be made on the above-described embodiment as long as such alterations cause no departure from the spirit and the scope of the present invention defined by the accompanying claims.

EXAMPLES

Pneumatic tires of Examples 1 to 3 were fabricated as follows. Each of the tires had a size specified as 215/60R16 and a tread pattern shown in FIG. 1. The inclination angle α of each lug groove 12 and the inclination angle β of each sipe 13 in the land area 10 located in the center section of the tread portion T were set as listed in Table 1. In the tires of Examples 1 to 3, each of the main grooves 1 and 2 had a depth of 8.8 mm, and the fine groove 11 had a depth of 4.0 mm. Each lug groove 12 had a variable depth that was gradually reduced from the 7-mm depth of its open-end side to the 4-mm depth of its closed-end side. Each sipe 13 had two different depths: the section between the corresponding main groove 1 and an intersection with a corresponding one of the lug grooves 12 had a depth of 6 mm; and the section between the fine groove 11 and the intersection with the corresponding lug groove 12 had a depth of 4 mm.

For comparative purposes, a pneumatic tire of Comparative Example 1 was fabricated as follows. The pneumatic tire of Comparative Example 1 had basically the same construction as that of the pneumatic tire of Example 1, but differed from it in the following points: no sipes 13 were formed in the land area 10 located in the center section of the tread portion T; and each lug groove 12 had a constant depth of 7 mm all along its length. In addition, a pneumatic tire of Comparative Example 2 was fabricated as follows. The pneumatic tire of Comparative Example 2 had basically the same construction as that of the pneumatic tire of Example 1, but differed from it in the following points: each sipe 13 formed in the land area 10 located in the center section of the tread portion T had a constant depth of 6 mm all along its length; and each lug groove 12 had a constant depth of 7 mm all along its length.

An assessment using these tires was conducted by an assessment method given below on: the driving stability on a dry road surface; and the performance on snow. Table 1 shows the assessment results.

Driving Stability on Dry Road Surface

Each of the tested tires was fitted to a wheel with a rim size of 16×6.5J, and then the wheels with tires were mounted on a vehicle for testing. The tires were inflated with a pressure of 200 kPa. While the vehicle for testing was running on a dry road surface of the test course, a sensory assessment was conducted on the driving stability. The assessment results shown in Table 1 are given by indices with the assessment result for Comparative Example 1 being normalized to 100. A larger index value for a tire means that the tire is more excellent in the driving stability on a dry road surface.

Performance on Snow

Each of the tested tires was fitted to a wheel with a rim size of 16×6.5J, and then the wheels with tires were mounted on a vehicle for testing. The tires were inflated with a pressure of 200 kPa. While the vehicle for testing was running on a snow-covered road surface of the test course, a sensory assessment was conducted on the performance on snow. The assessment results shown in Table 1 are given by indices with the assessment result for Comparative Example 1 being normalized to 100. A larger index value for a tire means that the tire is more excellent in the performance on snow.

TABLE 1

|  | Comparative Example 1 | Comparative Example 2 | Example 1 | Example 2 | Example 3 |
| --- | --- | --- | --- | --- | --- |
| Inclination angle α of lug groove (°) | 30 | 30 | 30 | 10 | 40 |
| Depth of lug groove (mm) | 7 | 7 | 4 to 7 | 4 to 7 | 4 to 7 |
| Inclination angle β of sipe (°) | — | 50 | 50 | 30 | 60 |
| Depth of sipe (mm) | — | 6 | 4 to 6 | 4 to 6 | 4 to 6 |
| Driving stability (index) | 100 | 95 | 107 | 105 | 108 |
| Performance on snow (index) | 100 | 105 | 105 | 107 | 104 |

The assessment results shown in Table 1 reveal clearly that all the tires of Examples 1 to 3 had advantages over the tire of Comparative Example 1 with respect to the driving stability on a dry road surface and the performance on snow. The tire of Comparative Example 2 had an improved performance on snow but a low driving stability on a dry road surface. This is because the lug grooves each of which was deep all along its length and the sipes each of which was deep all along its length were formed in the land area located in the center section of the tread portion T.

What is claimed is:

1. A pneumatic tire that has a directional tread pattern, comprising:
   a first land area being rib-shaped and extending in a center section of a tread portion in the tire-circumferential direction;
   a pair of first main grooves extending in the tire-circumferential direction and being adjacent respectively to the two sides of the first land area;
   a pair of second land areas extending in the tire-circumferential direction and being adjacent respectively to the outer sides of the first main grooves;
   a pair of second main grooves extending in the tire-circumferential direction and being adjacent respectively to the outer sides of the second land areas;
   a pair of third land areas extending in the tire-circumferential direction and being adjacent respectively to the outer sides of the second main grooves;
   a fine groove extending in the tire-circumferential direction and being formed at the center of the first land area;
   a plurality of lug grooves being formed in the first land area and each extending from a corresponding one of the first main grooves towards the fine groove; and
   a plurality of sipes being formed in the first land area and each extending from a corresponding one of the first main grooves towards the fine groove, wherein
   the plurality of lug grooves alternate with the plurality of sipes along the tire-circumferential direction,
   each of the lug grooves intersects with a corresponding one of the sipes,
   an end of each of the lug grooves formed in the first land area is formed as a dead end located between the fine groove and a corresponding one of the first main grooves,
   the width and the depth of each of the lug grooves formed in the first land area are gradually reduced from the open-end side of the lug groove to the closed-end side thereof,
   each of the sipes formed in the first land area communicates with the fine groove, and
   each of the sipes formed in the first land area includes: a deeper section which lies between a corresponding one of the first main grooves and an intersection with a corresponding one of the lug grooves; and a shallower section which lies between the fine groove and the intersection with the corresponding lug groove and which is shallower than the deeper section.

2. The pneumatic tire according to claim 1, wherein
   each of the lug grooves and of the sipes formed in the first land area has an inclination angle with respect to the tire-circumferential direction, and
   at least either one of the lug groove and the sipe is curved.

3. The pneumatic tire according to claim 2, wherein
   each lug groove in the first land area has an inclination angle of 10° to 40° with respect to the tire-circumferential direction, and
   each sipe in the first land area has an inclination angle of 30° to 60° with respect to the tire-circumferential direction.

4. The pneumatic tire according to any one of claims 1 to 3 further comprising a plurality of lug grooves formed in each of the second land areas, wherein each second land area is formed in a block column including a plurality of blocks defined by the plurality of lug grooves.

5. The pneumatic tire according to claim 4 wherein each of the lug grooves in the second land areas is formed on an extended line of a corresponding one of the lug grooves in the first land area.

6. The pneumatic tire according to claim 4 further comprising:
   a plurality of lug grooves formed in each of the third land areas, each of the lug grooves formed in the third land areas having a larger inclination angle with respect to the tire-circumferential direction than that of each of the lug grooves formed in the second land areas, and each of the lug grooves formed in the third land areas having an opening to a corresponding one of contact edges and not communicating with a corresponding one of the second main grooves; and
   a plurality of sipes formed in each of the third land areas, each of the sipes formed in the third land areas being curved and bow-shaped, and each of the sipes formed in the third land areas having openings both to a corresponding one of the second main grooves and to a corresponding one of the contact edges,
   wherein, in each of the third land areas, the lug grooves alternate with the sipes along the tire-circumferential direction, and
   in each of the third land areas, each of the lug grooves intersects with a corresponding one of the sipes.

* * * * *